(12) United States Patent
Joseph et al.

(10) Patent No.: US 10,301,942 B2
(45) Date of Patent: May 28, 2019

(54) AEROFOIL

(71) Applicant: ROLLS-ROYCE plc, London (GB)

(72) Inventors: Philip Joseph, Southampton (GB);
Narayanan Subramanian, Dhanbad (IN); Chaitanya Paruchuri, Southampton (GB); Jae-Wook Kim, Southampton (GB)

(73) Assignee: ROLLS-ROYCE PLC, London (GB)

( * ) Notice: Subject to any disclaimer, the term of this patent is extended or adjusted under 35 U.S.C. 154(b) by 398 days.

(21) Appl. No.: 15/211,306

(22) Filed: Jul. 15, 2016

(65) Prior Publication Data

US 2017/0022820 A1    Jan. 26, 2017

(30) Foreign Application Priority Data

Jul. 20, 2015 (GB) .................................. 1512688.1

(51) Int. Cl.
*F01D 5/14* (2006.01)
*F01D 9/04* (2006.01)

(52) U.S. Cl.
CPC ............. *F01D 5/141* (2013.01); *F01D 9/041* (2013.01); *F05D 2200/262* (2013.01); *F05D 2220/323* (2013.01); *F05D 2240/121* (2013.01); *F05D 2240/303* (2013.01); *F05D 2240/304* (2013.01); *F05D 2250/18* (2013.01); *F05D 2260/96* (2013.01); *Y02T 50/673* (2013.01)

(58) Field of Classification Search
CPC .... F01D 5/141; F01D 9/041; F05D 2240/121; F05D 2240/304; F05D 2240/303; F05D 2220/323; F05D 2200/262; F05D 2250/18; F05D 2260/96; Y02T 50/673
See application file for complete search history.

(56) References Cited

U.S. PATENT DOCUMENTS

| | | | | |
|---|---|---|---|---|
| 4,089,618 A | * | 5/1978 | Patel | F04D 29/668 416/228 |
| 4,229,140 A | * | 10/1980 | Scott | F01D 5/141 415/115 |
| 4,720,239 A | * | 1/1988 | Owczarek | F01D 5/141 415/119 |
| 4,830,315 A | * | 5/1989 | Presz, Jr. | B64C 21/10 114/102.29 |

(Continued)

FOREIGN PATENT DOCUMENTS

| | | |
|---|---|---|
| GB | 2 493 293 A | 1/2013 |
| GB | 2 497 739 A | 6/2013 |
| WO | 2011/157849 A2 | 12/2011 |

OTHER PUBLICATIONS

Jan. 13, 2016 Search Report issued in British Patent Application No. GB1512688.1.

(Continued)

*Primary Examiner* — Dwayne J White
*Assistant Examiner* — Adam W Brown
(74) *Attorney, Agent, or Firm* — Oliff PLC

(57) ABSTRACT

An aerofoil component (32) defining an in use leading edge (38) and a trailing edge (40). At least one of the leading edge and the trailing edge (38, 40) comprises a plurality of first and second recesses (52, 56) projecting in a direction corresponding with an in use flow direction, the first and second recesses being spaced apart normal to the in use flow direction and having a different chordal extent.

12 Claims, 14 Drawing Sheets

(56) References Cited

U.S. PATENT DOCUMENTS

| | | | | |
|---|---|---|---|---|
| 5,088,665 A * | 2/1992 | Vijgen | ...................... | B64C 23/06 |
| | | | | 244/198 |
| 5,386,955 A * | 2/1995 | Savill | ........................ | B63B 1/34 |
| | | | | 138/38 |
| 5,533,865 A * | 7/1996 | Dassen | ................. | F03D 1/0608 |
| | | | | 244/200 |
| 5,642,985 A * | 7/1997 | Spear | ...................... | F01D 5/141 |
| | | | | 415/181 |
| 6,431,498 B1 | 8/2002 | Watts et al. | | |
| 6,733,240 B2 * | 5/2004 | Gliebe | .................... | F01D 5/141 |
| | | | | 416/228 |
| 7,484,937 B2 * | 2/2009 | Johann | .................... | F01D 5/141 |
| | | | | 416/228 |
| 8,029,242 B2 * | 10/2011 | Teraoka | .................. | F04D 17/04 |
| | | | | 416/223 R |
| 8,083,487 B2 * | 12/2011 | Wood | ...................... | F01D 5/141 |
| | | | | 416/223 R |
| 8,414,261 B2 * | 4/2013 | Bonnet | ................. | F03D 1/0641 |
| | | | | 415/119 |
| 8,460,779 B2 * | 6/2013 | Gupta | ..................... | B64C 21/10 |
| | | | | 428/156 |
| 8,794,926 B2 * | 8/2014 | Routier | .................... | F01D 5/141 |
| | | | | 416/228 |
| 8,794,927 B2 * | 8/2014 | Vassilicos | ................. | F15D 1/10 |
| | | | | 416/228 |
| 9,121,294 B2 * | 9/2015 | Kray | ....................... | F01D 5/141 |
| 9,249,666 B2 * | 2/2016 | Wood | ..................... | F04D 29/324 |
| 9,341,158 B2 * | 5/2016 | Smith | .................... | F03D 1/0633 |
| 9,518,585 B2 * | 12/2016 | Choi | ..................... | F04D 19/002 |
| 9,951,626 B2 * | 4/2018 | Gruber | .................... | F01D 5/141 |
| 2009/0074585 A1 * | 3/2009 | Koegler | ................. | F03D 1/0675 |
| | | | | 416/228 |
| 2011/0058955 A1 | 3/2011 | Jung et al. | | |
| 2013/0164488 A1 * | 6/2013 | Wood | ................... | F04D 29/324 |
| | | | | 428/80 |

OTHER PUBLICATIONS

Dec. 2, 2016 Search Report issued in European Patent Application No. 16 17 9463.

* cited by examiner

Lambda 5, 10 - h25

FIG. 5(a)(iii)

Lambda 5, 10 - h20

FIG. 5(a)(ii)

Lambda 5, 10 - h15

Lambda 10, 15 - h25

FIG. 5(b)(iii)

Lambda 10, 15 - h20

FIG. 5(b)(ii)

Lambda 10, 15 - h15

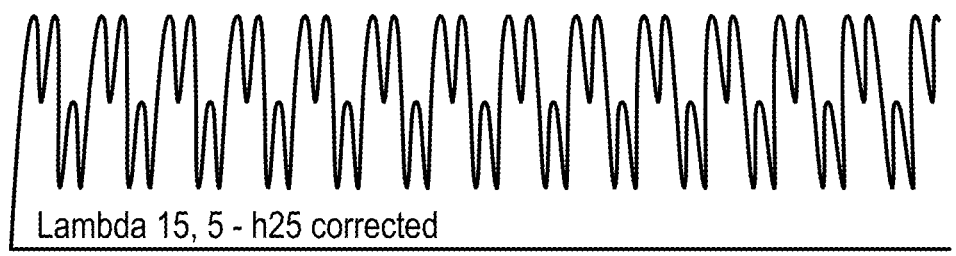
Fig 5 (c) (iii)
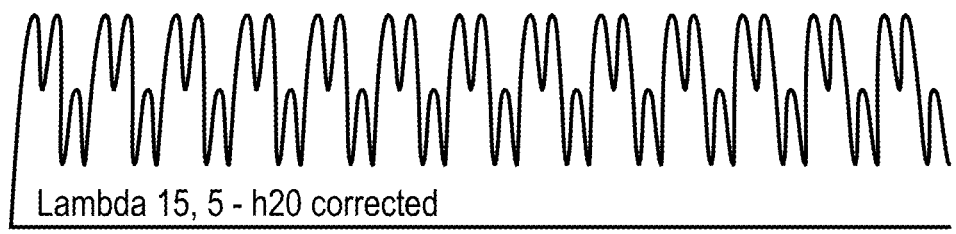
Fig 5 (c) (ii)
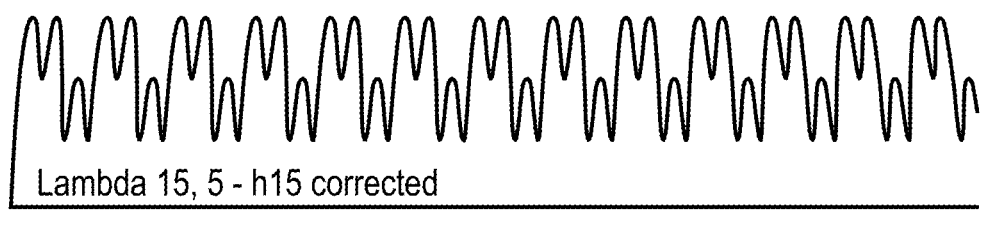
Fig 5 (c) (i)

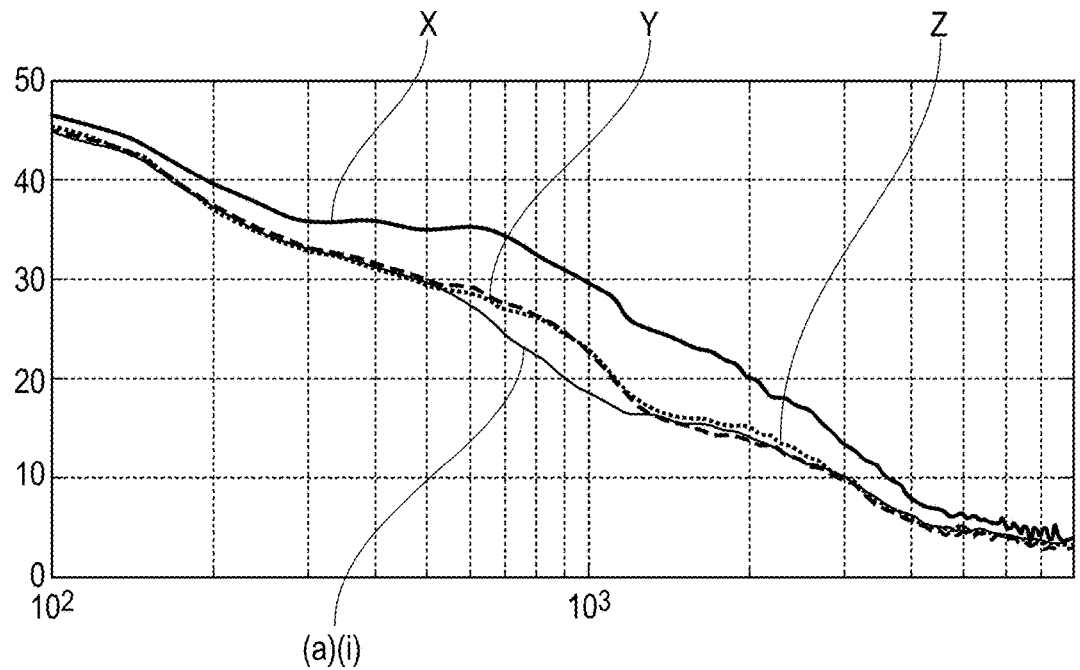
FIG. 6(a)(i)
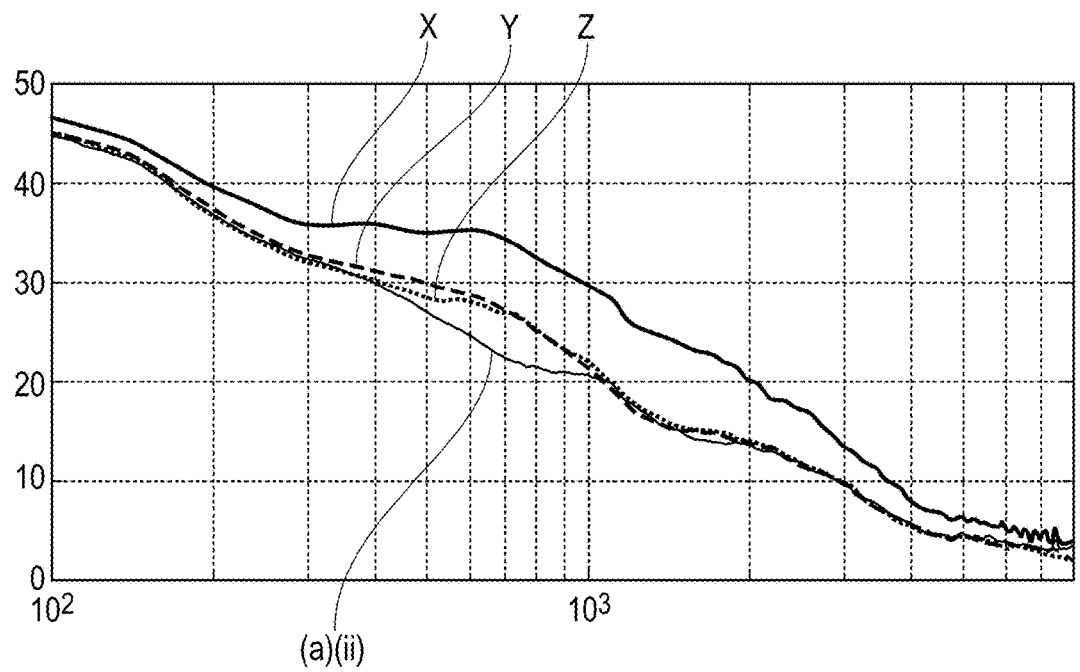
FIG. 6(a)(ii)

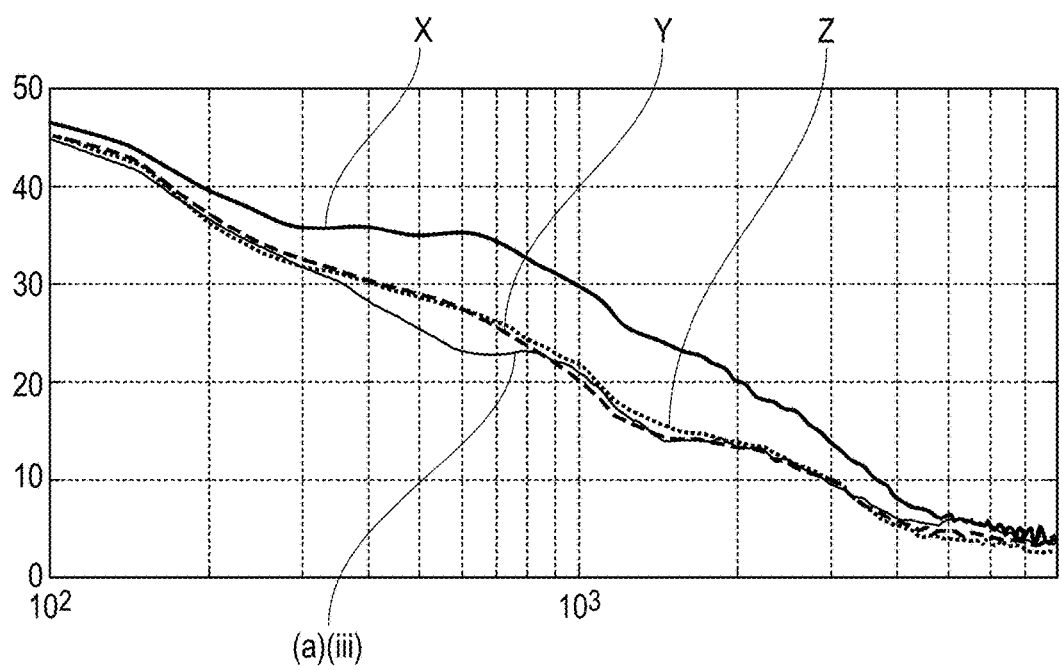
FIG. 6(a)(iii)

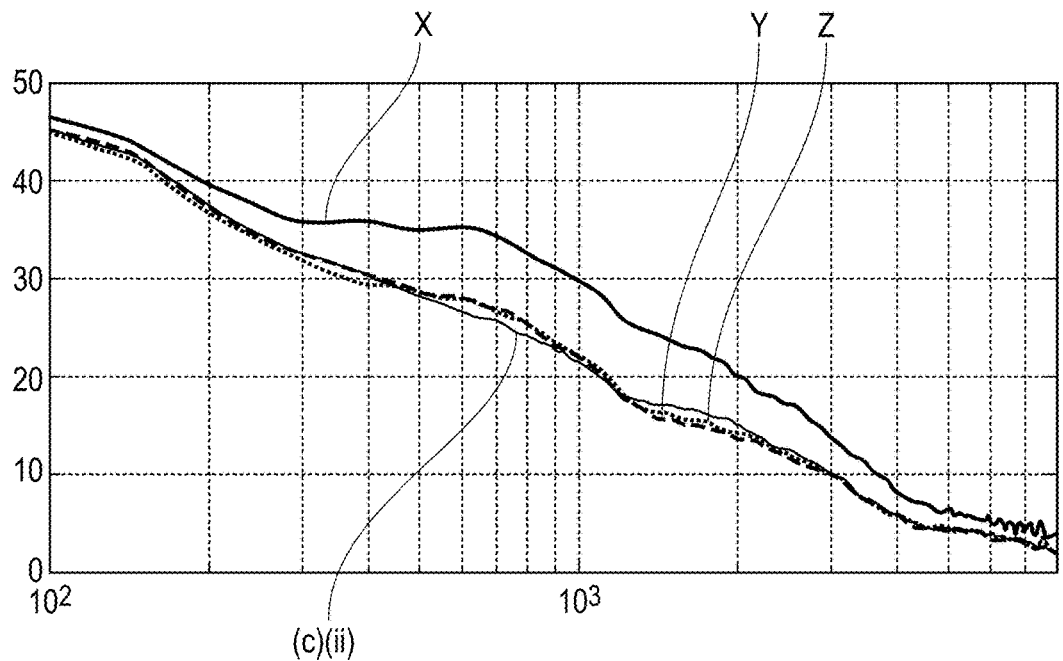
FIG. 6(c)(ii)
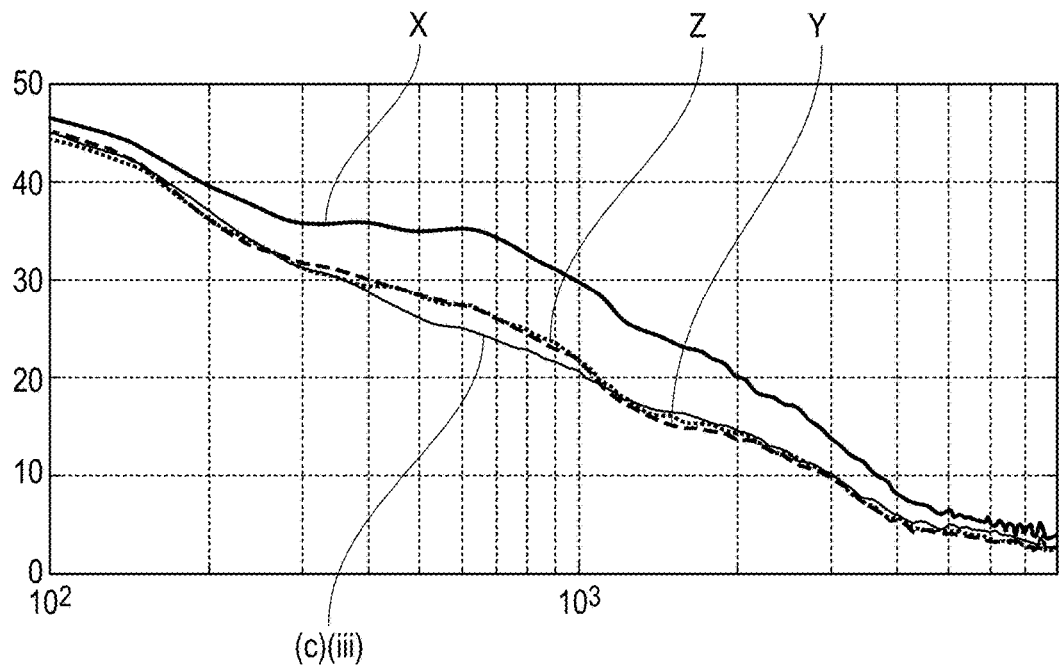
FIG. 6(c)(iii)

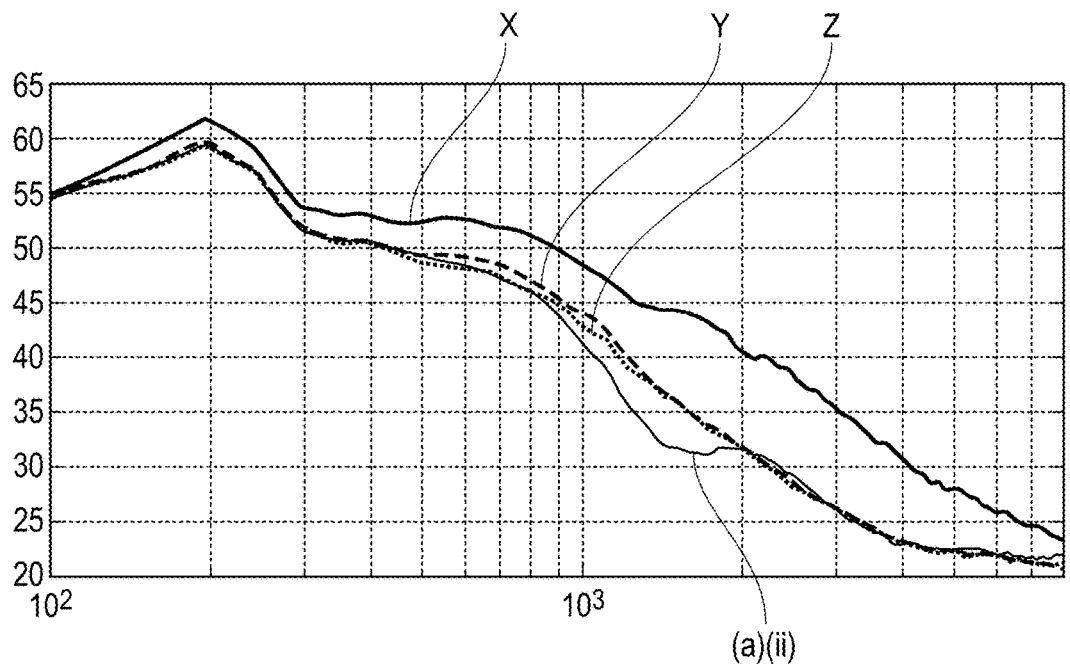
FIG. 7(a)(ii)
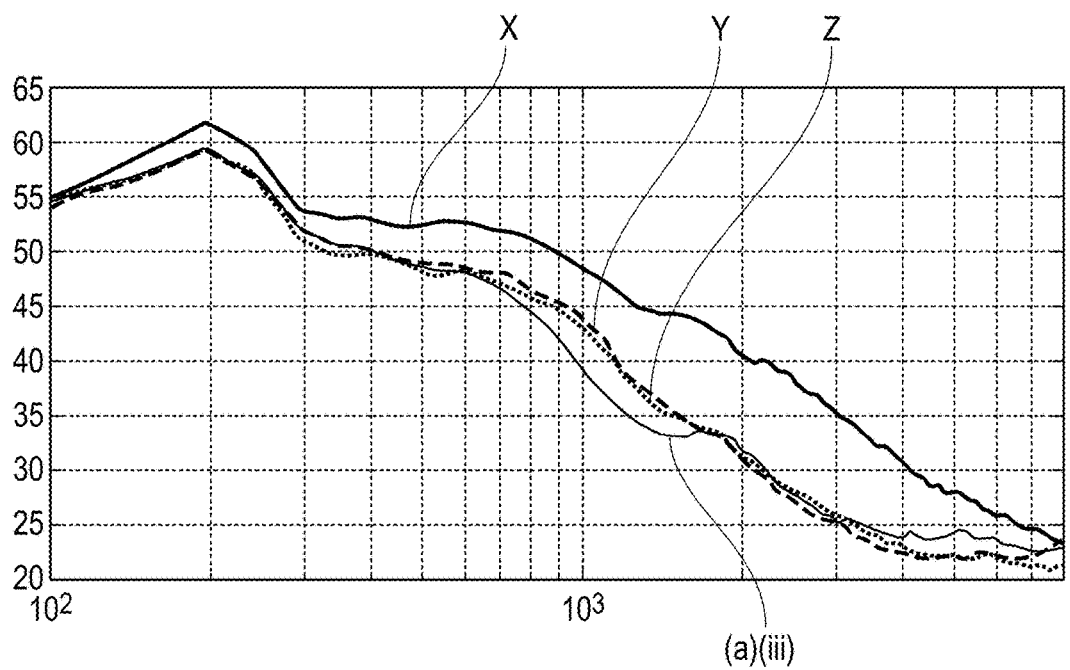
FIG. 7(a)(iii)

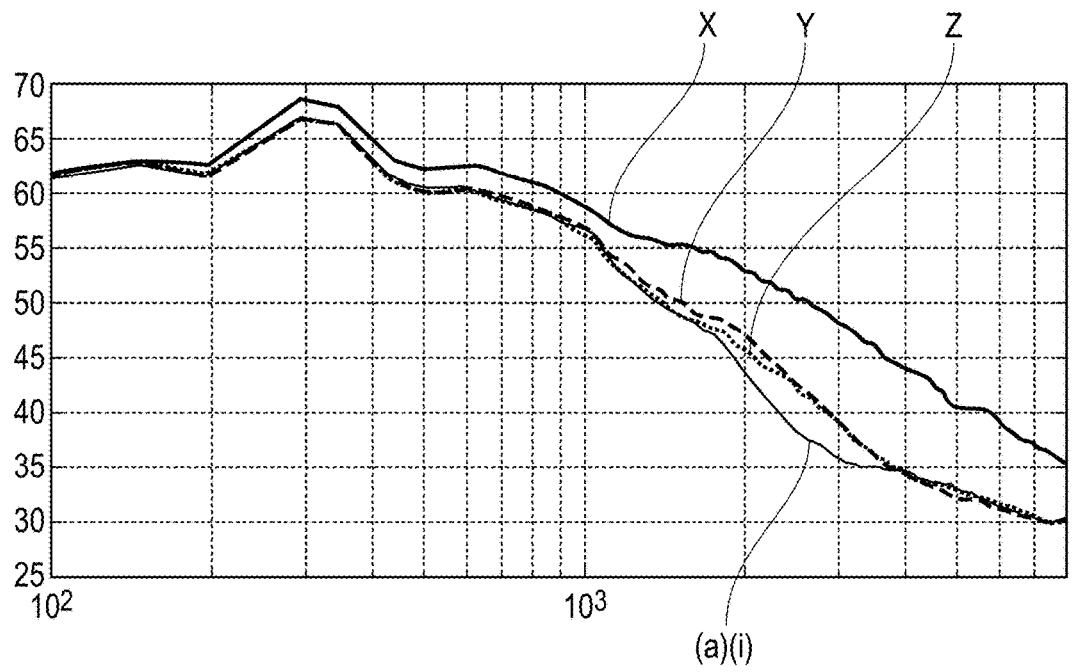
FIG. 8(a)(i)
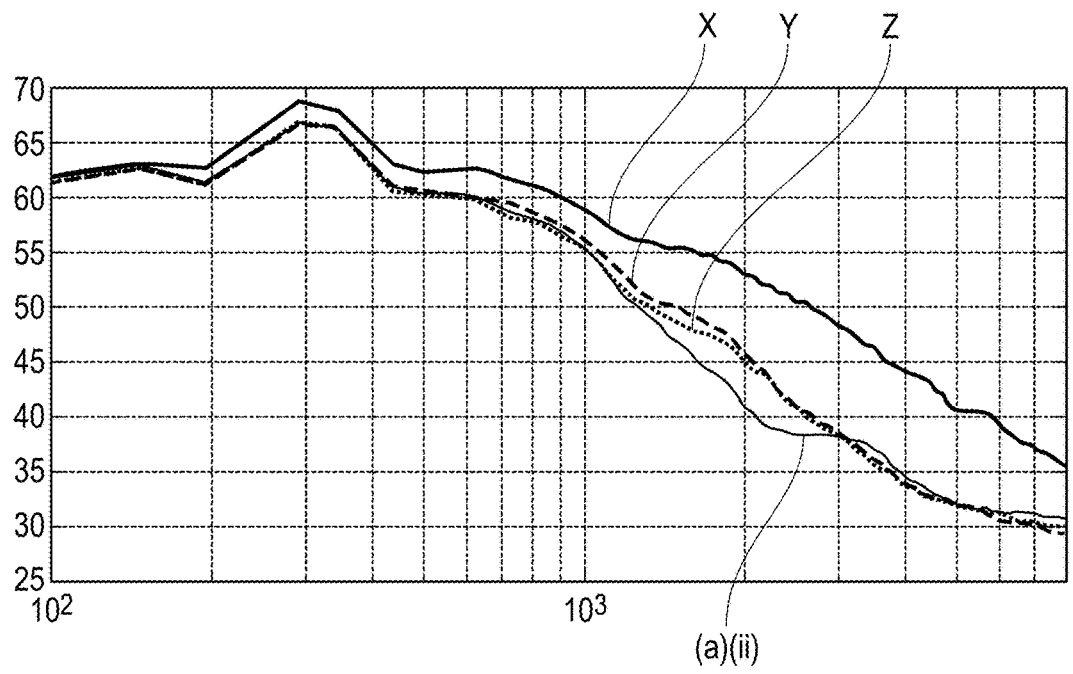
FIG. 8(a)(ii)

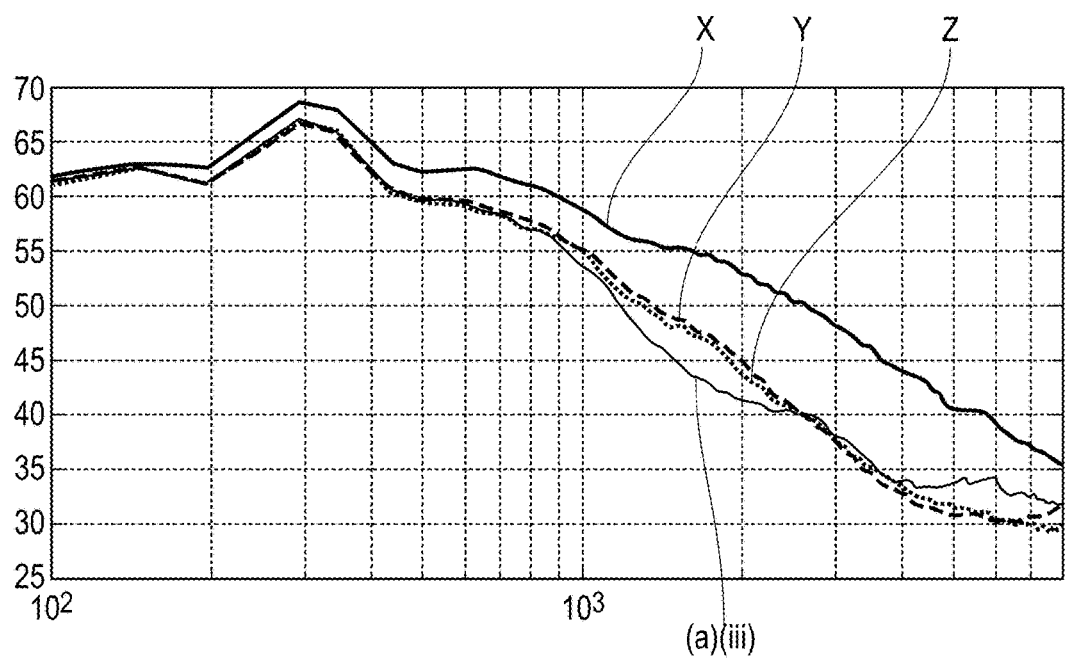
FIG. 8(a)(iii)

AEROFOIL

The present disclosure concerns an aerofoil, particularly but not exclusively, an aerofoil for a gas turbine engine having a reduced broadband noise profile in use.

Noise from aircraft is an ongoing environmental concern. There are typically several sources of noise from an aircraft, including jet noise produced by shear interaction between the jet exhaust from gas turbine engines, and aerodynamic noise caused primarily by turbulent air created by the flow of air over aircraft surfaces.

As aircraft engine bypass ratios are increased, aircraft aerodynamic noise is becoming a relatively large contributor to overall aircraft noise. In particular, turbulence created on the leading and trailing edges of aerofoil surfaces is thought to produce a significant proportion of noise produced by an aircraft. Noise created by these mechanisms often has a wide range of frequencies (known as "broadband noise"), and is particularly difficult to eliminate.

Examples of aerofoils on aircraft include the wings and tail surfaces, as well as smaller components such as control surfaces and high lift devices such as flaps and slats. The gas turbine engines of the aircraft also typically include several aerofoils, including compressor and turbine rotors and stators, fan rotors and Outlet Guide Vanes (OGV). The gas turbine engine nacelle is also typically aerofoil shaped.

It has been proposed to provide wave-like projections on the leading edge of an aerofoil, as proposed for example in U.S. Pat. No. 6,431,498. It is thought that such projections reduce drag as well as reduce noise to some extent, as evidenced for example in US2013164488. Such projections have been proposed for both fixed and rotating aerofoils, as proposed for example in US2011058955. However, such projections do not eliminate noise completely, and it is therefore desirable to provide an aerofoil having improved noise attenuation properties.

The term "chord" will be understood to refer to the distance between the leading and trailing edge of an aerofoil, measured parallel to the normal airflow over the wing. The term "chordal" will be understood to refer to a direction parallel to the chord. The term "span" will be understood to refer to a direction generally normal to the chord, extending between a root and a tip of an aerofoil component.

According to a first aspect of the disclosure there is provided an aerofoil component defining an in use leading edge and a trailing edge, at least one of the leading edge and the trailing edge defining a waveform profile, wherein the waveform profile extends in a spanwise direction and comprises a superposition of a first wave and a second wave, the first and second waves having different wavelengths such that the waveform profile defines a plurality of first and second generally chordwise extending recesses spaced in a spanwise direction and having a different extent in the chordwise direction.

Advantageously, it has been found that the disclosed aerofoil provides reduce broadband noise when in use compared to prior arrangements.

One or more first recess may be separated from a further first recess in a spanwise direction by one or more second recess.

The first and second waves may have substantially the same amplitude. The waveform may comprise a sinusoidal wave.

The waveform profile may be of the form $$c(r) = C_0 + h_1 \cos\left(\frac{2\pi r}{\gamma_1}\right) + h_2 \cos\left(\frac{2\pi r}{\gamma_2}\right)$$

where c(r) is representative of the chordwise extent c of the leading or trailing edge from the mean chord line $C_0$ as a function of the span r, $h_1$ and $h_2$ are representative of the amplitude of the first and second waves respectively, and $\gamma_1$ and $\gamma_2$ are representative of the wavelength of the first and second waves. $\gamma_1$ may have a different value to $\gamma_2$. $h_1$ and $h_2$ may have the same value.

In a first example, $\gamma_1/c_0$ has a value of 1/30, and $\gamma_2/c_0$ has a value of 2/30. In a second example, $\gamma_1/c_0$ has a value of 2/30, and $\gamma_2/c_0$ has a value of 1/10. In a third example, $\gamma_1/c_0$ has a value of 1/30, and $\gamma_2/c_0$ has a value of 1/10. $\gamma_1/\gamma_2$ may be between ½ and 2.

$h/c_0$ may have a value between 1/10 and 1/6. In a first example, $h/c_0$ has a value 1/10. In a second example, $h/c_0$ has a value of 4/30. In a third example, $h/c_0$ has a value of 1/6.

The aerofoil may have a cross sectional profile which may vary across the span of the aerofoil in accordance with the formula:

$$y(x, r) = \begin{cases} f(x/c_0), & 0 < x/c_0 < 2/3, \\ f(x/c(r)), & 2/3 \leq x/c(r) \leq 1 \end{cases}$$

Where y is representative of the thickness of the aerofoil at chordwise position x and spanwise position r, and f (x) defines an aerofoil cross sectional profile such as an NACA-65 series aerofoil, and wherein x=0 is defined as the trailing edge, and x=1 is defined as the leading edge.

The aerofoil component may comprise an aerofoil of a gas turbine engine, such as an outlet guide vane (OGV).

According to a second aspect of the present disclosure there is provided a gas turbine engine comprising an aerofoil component in accordance with the first aspect of the present disclosure.

According to a third aspect of the present disclosure there is provided an aircraft comprising an aerofoil component in accordance with the first aspect of the present disclosure.

According to a fourth aspect of the present disclosure there is provided a method of designing an aerofoil component, the method comprising the steps of: defining a first way and a second wave, the first wave having a different wavelength to the second wave;

superposing the first and second waves to define a superposed waveform; defining an aerofoil having a leading or trailing edge profile comprising the superposed waveform such that the leading or trailing edge defines a plurality of first and second generally chordwise extending recesses spaced in a spanwise direction and having a different extent in the chordwise direction.

The skilled person will appreciate that except where mutually exclusive, a feature described in relation to any one of the above aspects of the invention may be applied mutatis mutandis to any other aspect of the invention.

Embodiments of the invention will now be described by way of example only, with reference to the Figures, in which.

Figure 5A:
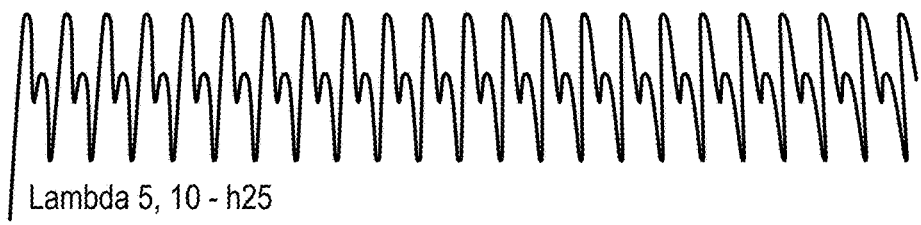
Figure 5A:
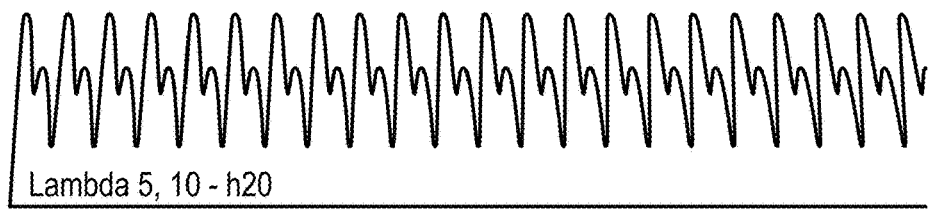
Figure 5A:
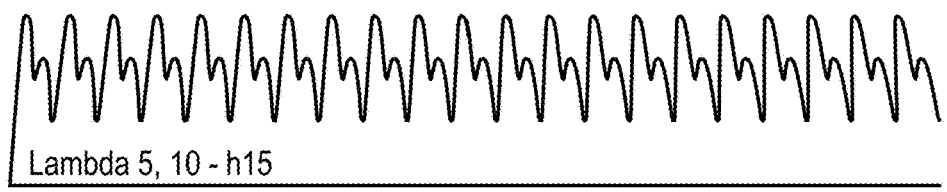
Figure 5B:
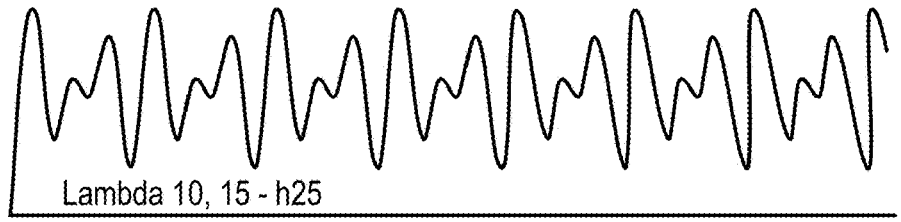
Figure 5B:
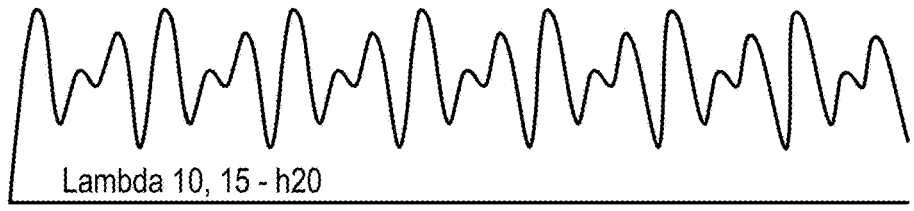
Figure 5B:
Figure 7A:
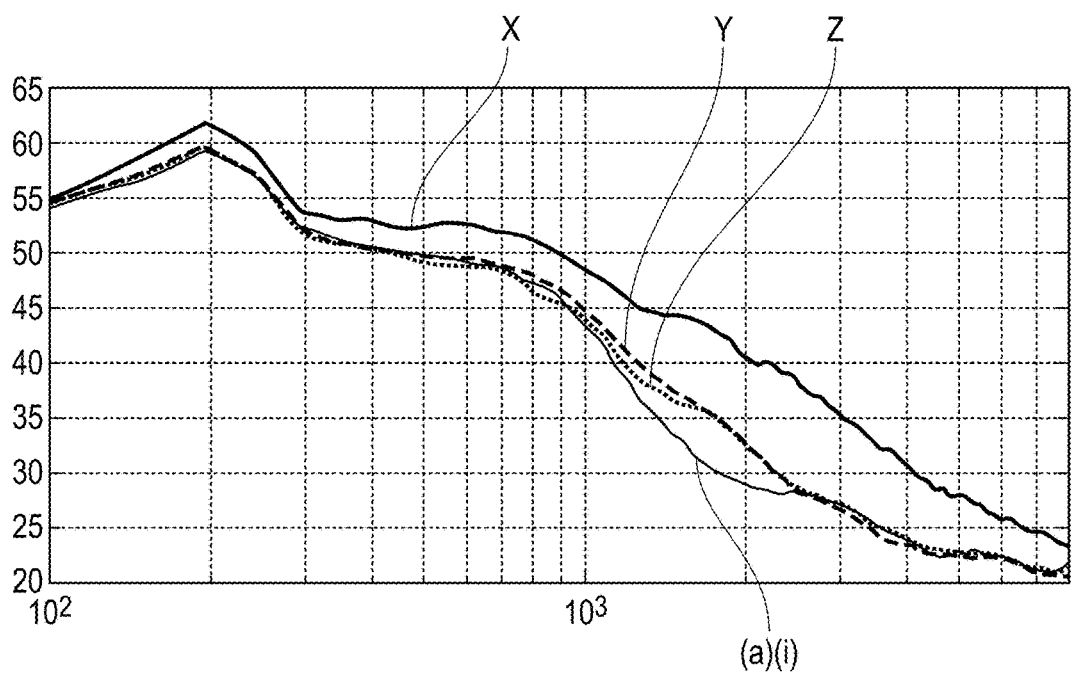
Figure 9:
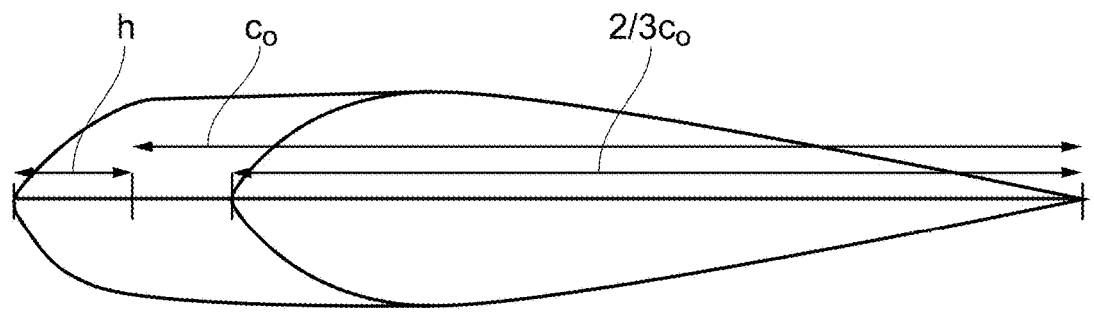
Figure 10:
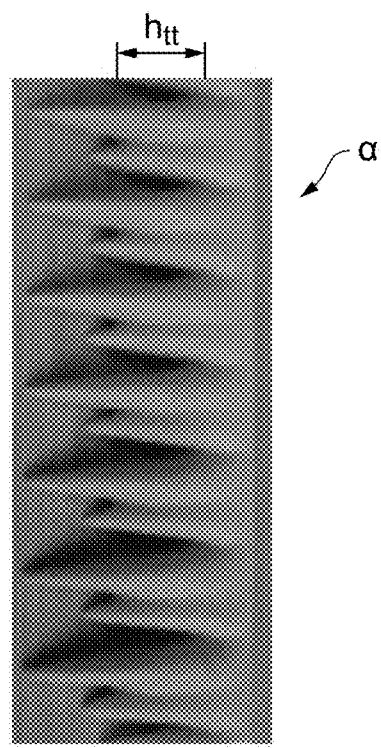
Figure 11:
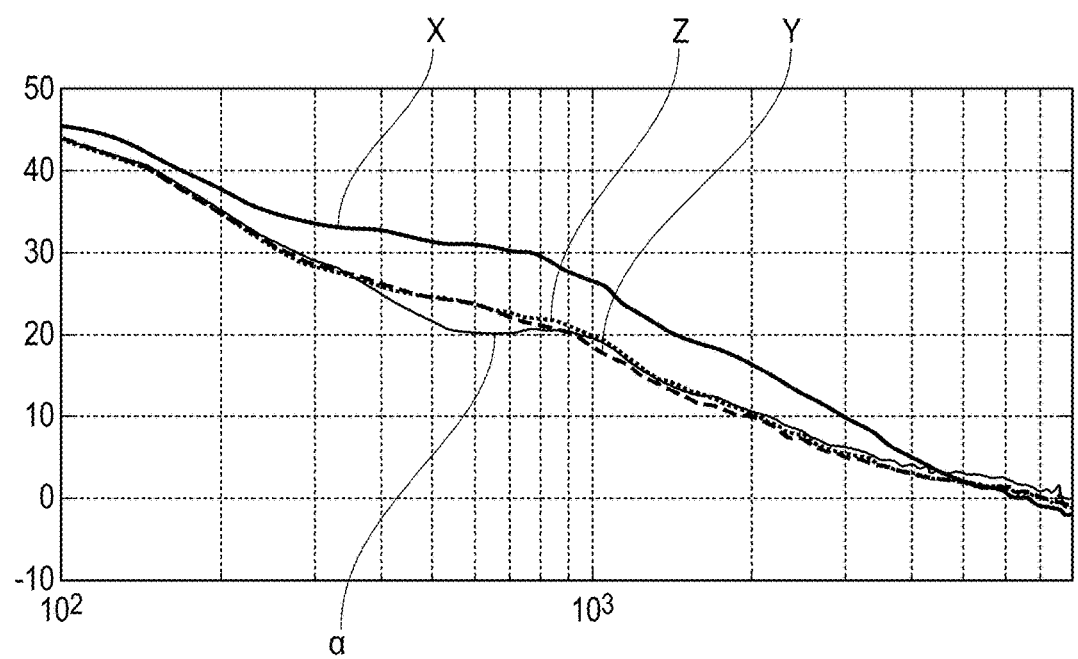

FIGS. 5a to 5c(*i*) to (*iii*) are plan views from above of leading edges of aerofoils in accordance with the present invention;

FIGS. 6a(i) to 6(a)(iii) are graphs showing experimental results of noise testing of aerofoils shown in FIGS. 5a(i) to (iii) respectively at impinging airspeeds of 20 m/s;

FIGS. 6(c)(ii) and 6(c)(iii) are graphs showing experimental results of noise testing of aerofoils shown in FIGS. 5c(ii) and (iii) at impinging airspeeds of 20 m/s FIGS. 7(a)(i) to 7(a) (iii) are graphs showing experimental results of noise testing of aerofoils shown in FIGS. 5a(i) to (iii) respectively at impinging airspeeds of 40/s;

FIGS. 8(a)(i) to 8(a) (iii) graphs showing experimental results of noise testing of aerofoils shown in FIGS. 5a(i) to (iii) respectively at impinging airspeeds of 60/s;

FIG. 9 is a cross sectional view of an aerofoil in accordance with the present invention;

FIG. 10 is a plan view of a further aerofoil in accordance with the present invention; and FIG. 11 is a graph showing experimental results of noise testing of the aerofoil shown in FIG. 10.

Figure 1:
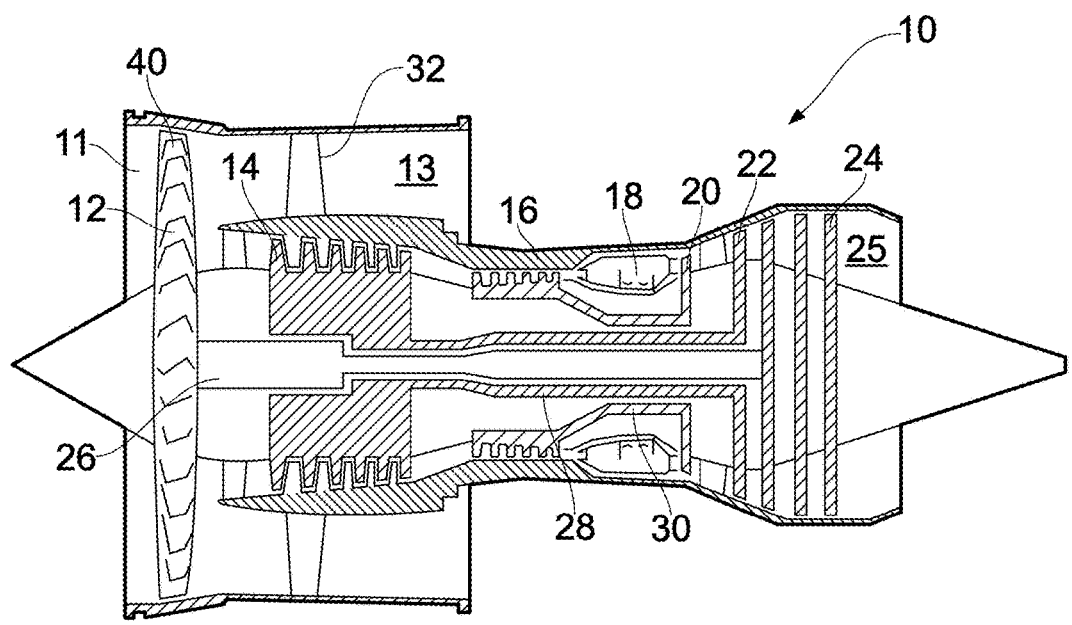
FIG. 1 is a sectional side view of a gas turbine engine.
Figure 2:
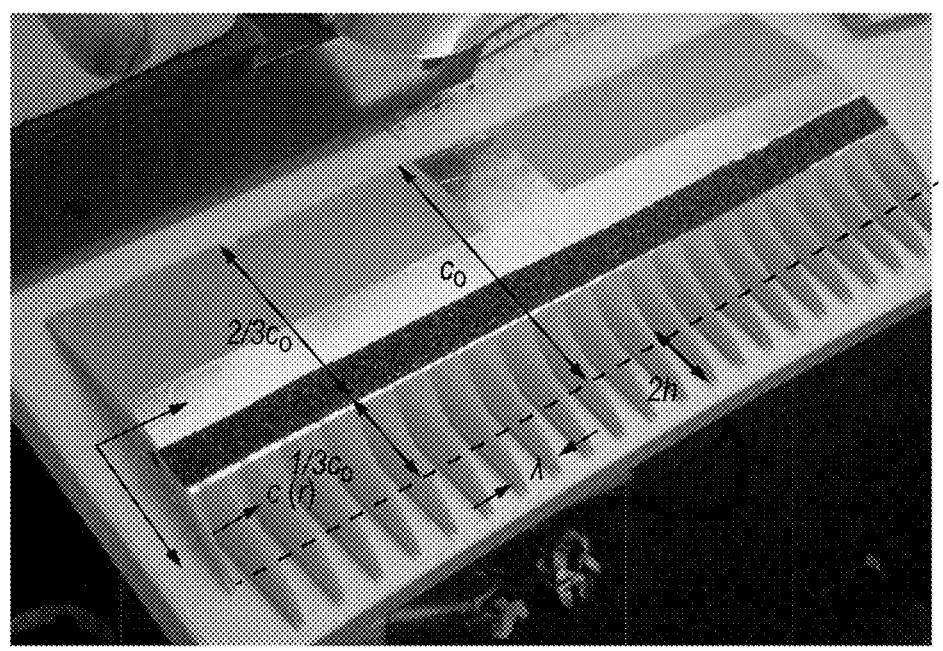
FIG. 2 is a perspective view of a prior aerofoil.

FIG. 1 shows a high bypass turbofan engine 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. Air directed rearwardly by the fan 12 is directed to an Outlet Guide Vane (OGV) 32, which provides structural support for the engine 10, and removes swirl from the airflow. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shafts.

Each of the fan 12, compressors 14, 16 and turbines 20, 22, 24 comprise a plurality of aerofoil profiled rotating blades and stationary stators (such as the OGV 32), which is located downstream of the fan 12. Consequently, air travelling over the leading and trailing edges of these surfaces can contribute to aircraft noise. Since the core of the engine is shielded by the engine core casing, the majority of the noise emanates from the fan 12, OGV 32 and nacelle.

Figure 3:
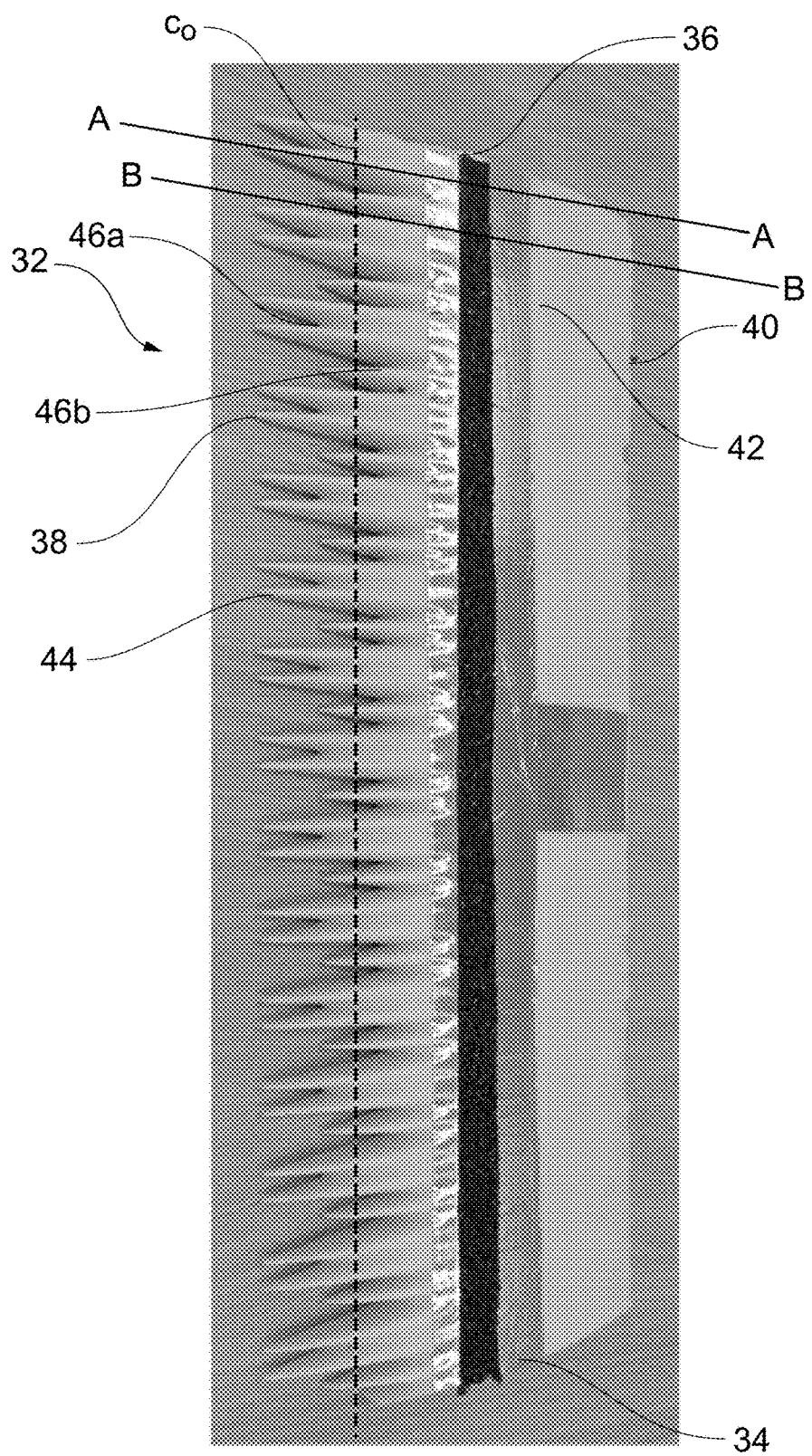
FIG. 3 is a plan view from above showing a leading edge of a first aerofoil in accordance with the present disclosure.

Part of the OGV 32 is shown in further detail in FIG. 3. In this example, the OGV 32 has an aerofoil profile generally corresponding to an NACA-65 series aerofoil. The OGV 32 defines a root 34, a tip 36, a leading edge 38, a trailing edge 40, a suction surface 42 and a pressure surface (not shown) on the opposite side to the suction surface 42. The OGV 32 defines a mean chord line $C_0$ defined by a line extending from a root 34 to a tip 36 of the OGV 32 along the arithmetic mean of the position of the leading edge 38 of the aerofoil 32.

The leading edge 38 of the aerofoil 32 has a serrated profile defined by a plurality of projections 44 separated by first and second recesses 46a, 46b. Each projection 44 extends in a generally forward, chordwise (i.e. in a direction parallel to airflow in use) direction, and each recesses extends in a generally rearward, chordwise direction such that the leading edge 38 defines a continuously inwardly and outwardly curving surface.

Figure 4A:
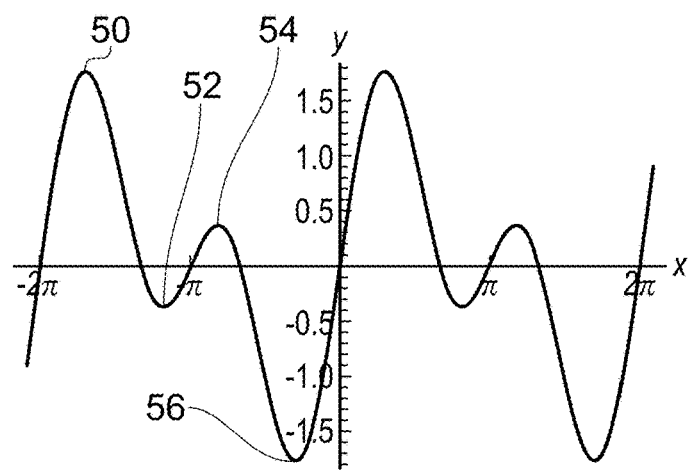
FIGS. 4a to 4c are schematics showing waveforms of leading edges of aerofoils in accordance with the present disclosure.
Figure 4B:
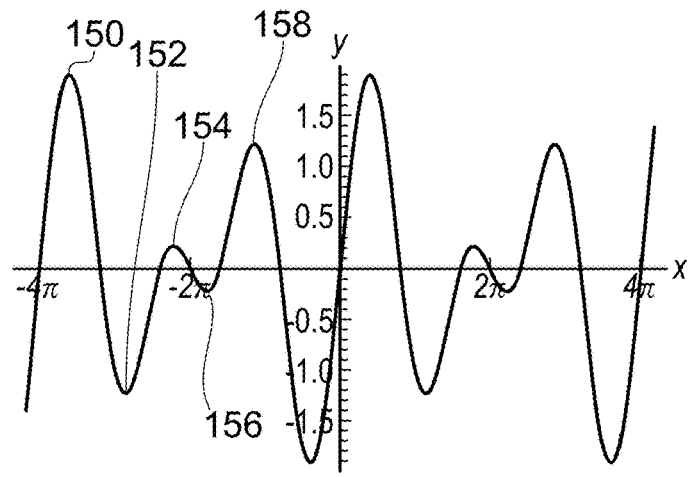
Figure 4C:
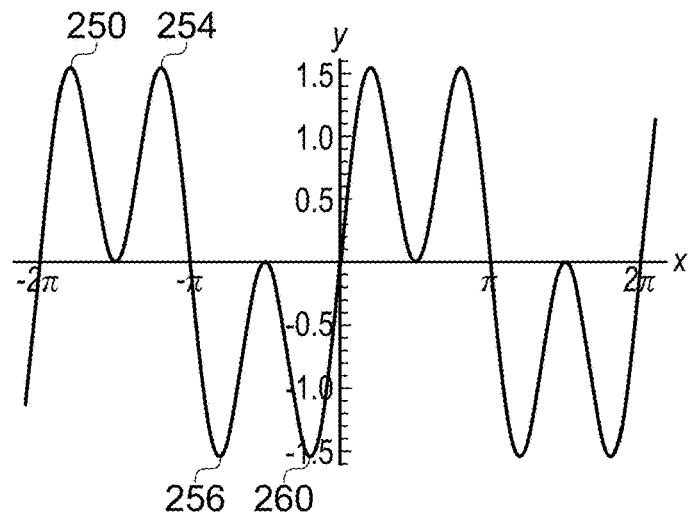

The plan profile (i.e. the projection of the leading edge 38 when viewed from either the suction or pressure surface) of the OGV 32 is defined by a waveform, as shown in FIG. 4(c). The waveform can be defined by superimposing first and second waves having different wavelengths to form the superposed waveform.

In general, the waveform can be described by the following equation:

$$c(r) = C_0 + h_1 \cos\left(\frac{2\pi r}{\gamma_1}\right) + h_2 \cos\left(\frac{2\pi r}{\gamma_2}\right) \quad \text{(formula 1)}$$

Where c(r) is representative of the spanwise variation of chordwise extent c of the projection from the mean chord line $C_0$, along the span r, $h_1$ and $h_2$ are representative of the amplitude of the $1^{st}$ and $2^{nd}$ waveforms respectively, and $\gamma_1$ and $\gamma_2$ are representative of the wavelength of the $1^{st}$ and $2^{nd}$ waveforms respectively. In other words, the chord length of the aerofoil at a spanwise position r is defined by formula 1.

In the embodiments shown in FIGS. 4(a) to 4(c), two sinusoidal waveforms having wavelengths $$\frac{\gamma_1}{c_0} = 0.033 \text{ and } \frac{\gamma_2}{c_0} = 0.067, \frac{\gamma_1}{c_0} = 0.067 \text{ and } \frac{\gamma_2}{c_0} = 0.1, \text{ and}$$

$$\frac{\gamma_1}{c_0} = 0.1 \text{ and } \frac{\gamma_2}{c_0} = 0.033$$

respectively, are superimposed, resulting in the waveforms shown in the figures. In the specific samples tested, these wavelengths corresponded to wavelengths of $\gamma_1$=5 mm and $\gamma_2$=10 mm, of $\gamma_1$=10 mm and $\gamma_2$=15 mm and of $\gamma_1$=15 mm and $\gamma_2$=5 mm respectively. As will be understood, an important feature of the superimposed waveform is the ratio of the first and second (and if present, further) wavelengths, i.e.

$$\frac{\gamma_1}{\gamma_2}.$$

For example, in the first embodiment shown in FIG. 4(a), the ratio is approximately 2. In the embodiment shown in FIG. 4(b), the ratio $$\frac{\gamma_1}{\gamma_2}$$

is approximately 1.5. In the embodiment shown in FIG. 4(c), the ratio $$\frac{\gamma_1}{\gamma_2}$$

is 3. In experiments (as described in further detail below), a ratio of 2 has been found to be most effective.

Consequently, the waveform shown in FIG. 4(*a*) can be described by the equation:

$$y = \cos\left(\frac{2\pi x}{0.033}\right) + \cos\left(\frac{2\pi x}{0.067}\right)$$

The waveform shown in FIG. 4(*b*) can be described by the equation:

$$y = \cos\left(\frac{2\pi x}{0.1}\right) + \cos\left(\frac{2\pi x}{0.067}\right)$$

The waveform shown in FIG. 4(*c*) can be described by the equation:

$$y = \cos\left(\frac{2\pi x}{0.033}\right) + \cos\left(\frac{2\pi x}{0.1}\right)$$

Where y represents the position along the chord line, and x represents the chordwise extent of the leading edge 38 from the mean chord line at position x.

FIGS. 5(*a*) to 5(*c*)(*i*) to (*iii*) each show images of spanwise cross sections of leading edges of an aerofoil in accordance with the present disclosure, as viewed from either the suction or pressure surface. As can be seen, the leading edge profile of each of FIGS. 5(*a*) to 5(*c*) corresponds to the waveform in FIGS. 4(*a*) to 4(*c*) respectively. In each of figures (*i*) to (*iii*), the maximum amplitude of the resultant superimposed waveform (which corresponds to the maximum extent of the projections from the minimum chordal extent relative to the mean chord length, $h_{max}/c_0$) corresponds to 0.1, 0.133 and 0.167 respectively. As will be understood, both the waveform and the maximum extent of the projections will have an impact both on the aerodynamics of the aerofoil, and the noise attenuation properties of the aerofoil.

As can be seen, the resultant leading edge profile shown in FIG. 4(*a*) comprises a continuous forward and rearward sweeping curve extending in a direction extending from the root to the tip. A pattern is defined, comprising a first forward extending protrusion 50 extending a relatively large extent beyond from the mean chord line $c_0$, followed by a relatively small first recess 52 such that the leading edge extends less than the mean chord line $c_0$ at the first recess 52, followed by a relatively small second forward extending protrusion 54 extending forwardly of the mean chord line $c_0$ to the same extent that the first recess 52 extends less than the mean chord line $c_0$, followed by a large second recess 56 extending less than the mean chord line $c_0$ to the same extent that the first forward extending protrusion 50 extends beyond the mean chord line $c_0$. The leading edge profile then returns to the mean chord line $c_0$, where the pattern is repeated. It will be understood that the pattern could be reversed, extending from the tip to the root.

This repeating pattern of projections and recesses/troughs produces a leading edge profile comprising repeating at least first and second chordwise extending recesses having different extents relative to the mean chord line, separated in a spanwise direction by at least first and second generally chordwise extending projections having different extents relative to the mean chord line. In the example shown in FIG. 5(*a*), the first recesses are separated by second recesses, such that alternating first and second recesses are provided.

The leading edge profile shown in FIG. 4(*b*) also comprises a continuous forward and rearward sweeping curve extending in a direction extending from the root to the tip. The pattern comprises a first forward extending protrusion 150 extending a relatively large extent beyond from the mean chord line, followed by a relatively small first recess 152 such that the leading edge extends less than the mean chord line $c_0$, followed by a relatively small second forward extending protrusion 154 extending forwardly of the mean chord line to a lesser extent than either the first recess 152 extends less than the mean chord line or the first protrusion extends forward of the mean chord line $c_0$, followed by a small second recess 156 extending less than the mean chord line to the same extent that the second forward extending protrusion 150 extends beyond the mean chord line $c_0$, followed by a 158 third forward protrusion extending forwardly of the mean chord line to a lesser extent than the first protrusion 150, but a greater extent than the second protrusion 156, followed by a third recess 160 extending less than the mean chord line $c_0$ to the same extent that the third protrusion 158 extends forward of the mean chord line $c_0$. The leading edge profile then returns to the mean chord line $c_0$, where the pattern is repeated.

Consequently, the leading edge profile of FIG. 4(*b*) comprises first, second and third projections, each having a different extent to one another and spaced from one another, and first, second and third recesses, which are similarly spaced in a spanwise direction and have different extents, i.e. their nadirs are spaced in a chordal direction.

The leading edge profile shown in FIG. 5(*c*) defines a pair of forward extending protrusions 250, 254 extending a relatively large extent beyond from the mean chord line separated in a spanwise direction by a recess. The forward extending protrusions 250, 254 are followed by a pair of inwardly extending recesses 256, 260 which have an extent such that the leading edge extends less than the mean chord line to the same extent as the forward extending protrusions 250, 254 extend beyond the mean chord line $c_0$. The leading edge profile then returns to the mean chord line $c_0$, where the pattern is repeated.

Consequently, the leading edge profile of FIG. 5(*c*) comprises first and second generally chordwise extending projections, with each first projection being spaced apart by two second projections.

FIG. 9 shows a cross sectional view through the OGV 32 along the line A-A shown in FIG. 3, and the line B-B shown in FIG. 3, in each case the OGV 32 being sectioned along a line extending in a generally chordwise direction from the leading to the trailing edge.

The chordal cross sectional profile of the OGV 32 can be described in accordance with the following equation:

$$y(x, r) = \begin{cases} f(x/c_0), & 0 < x/c_0 < 2/3, \\ f(x/c(r)), & 2/3 \leq x/c(r) \leq 1 \end{cases}$$

Where y is representative of the thickness of the aerofoil at chordwise position x and spanwise position r, and f(x)

defines an aerofoil profile such as an NACA-65 series aerofoil, and wherein x=0 is defined as the trailing edge, and x=1 is defined as the leading edge.

This profile is illustrated in FIG. 9 (which is not drawn to scale), wherein the cross section A-A (shown in dotted lines) represents the region 0<x, 1, and the cross section B-B (shown in solid lines) represents the region $0<x<2/3c_0$. The first ⅔ of the chordal distance between the trailing edge and the mean chord line is defined by an NACA-65 series aerofoil profile (though it will be understood that other aerofoil profiles could be used). In the case of section B-B therefore, the cross-sectional shape corresponds entirely to the NACA-65 series aerofoil shape. For the remainder of the aerofoil cross sectional however, from the ⅔ points to the leading edge, the chordal distance of this portion of the cross sectional profile is adjusted by a factor x/c(r). Consequently, the leading edge third of the chordal extent of the NACA-65 profile is transformed (i.e. "stretched") at different spanwise locations by a factor determined by the superimposed waveform, i.e. the chordal extent is linearly transformed by a factor 1/c(r).

In a first experimental series, flat plates representative of the leading edge profiles shown in FIGS. 5(a)(i) to (iii), 5(c)(ii) and 5(c)(iii) were tested in a wind tunnel at sea level pressure over a range of airflow velocities (U=20, 40, 60 and 80 m/s). In each case, a metallic flat plate of 2 mm thick [150 mm×450 m] was constructed by joining two flat plates each of 1 mm thick. This type of construction provides a slot at the leading edge of the flat plate for mounting the double frequency serration inserts cut from acrylic sheet of 2 mm thickness. The trailing edge of the flat plate was sharpened to eliminate vortex shedding noise.

FIGS. 6(a)(i) to 6(a)(iii) show the perceived noise (dB) of various leading edge profiles of various plates having otherwise similar dimensions, under similar conditions at an airflow velocity of 20 m/s. In FIG. 6(a)(i), line X represents a flat plate having a straight leading edge. Line Y represents a plate having a leading edge comprising projections defined by a waveform composed of a single sinusoidal wave having a single wavelength relative to the mean chord distance of $0.033\gamma/c_0$, and line Z represents a plate having a leading edge comprising projections defined by a waveform composed of a single sinusoidal wave having a single wavelength relative to the mean chord distance of $0.067\gamma/c_0$. In each case, the maximum height of the protrusions relative to the mean chord distance $h/c_0$ is 0.1. Line (a) (i) represents a plate having the leading edge profile shown in FIG. 5(a)(i). As can be seen, all of the flat plates having serrated leading edge profiles show a reduced noise profile across a wide range of frequencies from around $10^2$ to $10^4$ Hz, which represents the edge of normal human hearing. However, the double frequency leading edge profile plate shows a pronounced reduction in noise compared to the single frequency plates, particularly at frequencies around $10^3$ Hz. Consequently, the disclosed aerofoil profile provides reduced aerodynamic noise in use.

Without wishing to be restricted to theory, it is thought that the recesses/troughs located between each projection at downstream positions in the in use flow direction produce tone noise out of phase with noise produced by recesses/troughs upstream. Consequently, the noise cancels out, reducing overall noise. This is thought to be because the leading edge profile comprises similar troughs separated in a flow-wise direction $h_{tt}$. Since these troughs have similar geometry, they radiate similar tone noise, delayed in time by $U/h_{tt}$, where U is the flow velocity in the flow-wise direction. At a radiation frequency of $\omega=2\pi f$, this time delay translates to a phase shift of $\omega U/h_{tt}$. There therefore exists a particular (angular) frequency $\omega_0$, at which the radiation from adjacent troughs are 180° out of phase, i.e., $$\omega U/h_{tt}=\pi,$$

and hence the frequency $f_0$ of additional noise reduction is given by $$f_0=h_{tt}/2U$$

This destructive interference effect is an additional noise reduction mechanism that is not present for single frequency serrations, leading to additional reductions in radiated noise from the aerofoil leading edge, which are additional to the reductions in noise provided by a serrated leading edge.

In the case where there are more than two chordally spaced recesses (such as for the waveform shown in FIG. 4(b)), first tone noise produced by the first recess is cancelled by the second recess, and different tone noise (i.e. at a different frequency) is cancelled by the second recess, in view of the different distances between the first, second and third recesses. Similarly, tone noise at a third frequency produced by the second recess is cancelled by the third recess, in view of the distance between the second and third recess, where tis is different to the distance between either the first and second recess, or the first and third recess. Consequently, such an arrangement may provide a wider broadband noise reduction compared to waveforms having only first and second chordally spaced recesses.

Similarly, in FIG. 6(a)(ii), line X again represents the flat plate having a straight leading edge. Line Y and Z represent plates having similar leading edge serrations to those of FIG. 6(a)(ii), but with a maximum height relative to the mean chord distance $h_{max}/c_0$ of 0.133. Line (a) represents a plate having the leading edge profile shown in FIG. 5(a)(ii) (i.e. having longer protrusions relative to those of FIG. 5(a)(ii). Again, the plate having a leading edge having double wavelength protrusions shows improved nose reduction performance. However, in this case, the noise reduction of the double wavelength protrusion leading edge compared to the straight and single wavelength protrusion leading edges is particularly pronounced at lower frequencies, peaking at around 700 Hz.

In FIG. 6(a)(iii), the leading edge profile of FIG. 5(a)(iii) is compared to lines Y and Z, which are single wavelength protrusion leading edges wherein $h/c_0$ is 0.167. Again, the frequency profile of noise reduction is shifted to slightly lower frequencies. In general, it can be observed from these results that the frequency at which the maximum noise attenuation relative to the baseline leading edge occurs is approximately inversely proportional to the maximum amplitude of the protrusions relative to the chord distance $h_{max}/c_0$. This appears to be the case irrespective of relative airflow velocity. Conveniently therefore, a designer can choose a maximum protrusion height resulting in a noise reduction corresponding to the frequency of most interest.

FIG. 7(a)(i), shows test results of the same leading edge profiles X, Y, Z, and (a)(i) of FIG. 6(i), but with the airflow velocity increased to 40 m/s. In this case, it can be seen that the double wavelength leading edge protrusions again outperform the baseline and single wavelength leading edge protrusions in terms of noise attenuation. However, at these velocities, the relative reduction in noise occurs at higher frequencies, in this case, 1000 to 2000 Hz. FIGS. 7(a)(ii) and 7(a)(iii) show results from experiments on the same leading edge profiles as shown in FIGS. 6(a)(ii) and 6(a)(iii) respectively, but again at 40 m/s. Again, in each case, the frequency spectrum of the relative noise reduction is altered. Consequently, it will be understood that the designer will select a protrusion length which best suits the noise profile at the typical in use airflow velocities likely to be encountered.

FIGS. 8(a)(i) to 8(a)(iii) shows results from similar experiments as those shown in FIGS. 6(i) to 6(iii), but with the airflow velocity increased again to 60 m/s. Again, the sound attenuation spectrum is altered, in each case to a peak performance at around 3000 Hz. However, as can be seen in FIG. 8(iii), the noise attenuation performance for double wavelength protrusions having a height $h_{max}/c_0$ of 0.167 is inferior to that of single wavelength protrusions at higher frequencies, above around 3000 Hz. However, since these frequencies are perceived less by humans, this may be regarded as a good compromise.

Further experimental results were obtained for airflow velocities of 80 m/s. Again, it was found that the double wavelength protrusions outperformed the noise attenuation properties of the single wavelength protrusions over a wide frequency range. It is expected that similar results would be obtained at still higher airflow velocities. From these results, it would appear that the frequency at which the maximum noise reduction relative to the baseline straight leading edge occurs is approximately proportional to the relatively airflow velocity at the leading edge. In the context of an OGV, this would be the mean jet flow velocity.

FIGS. 6(c)(ii) and 6b(iii) show experimental results for windtunnel tests at 20 m/s for a second set of flat plates. Again, X represents a baseline plate, Y and Z represent plates having $\gamma/c_0=0.067$ and 0.1 respectively, and 6(c)(ii) and 6b(iii) represent the plates shown in FIGS. 5(c)(ii) and 5(c)(iii) respectively. As can be seen from a comparison with the results shown in FIGS. 6(a)(ii) and 6(a)(iii), the noise attenuation is less pronounced compared to prior arrangements, and so the arrangement shown in FIG. 4(a) is thought to be more effective than that shown in FIG. 4(c).

In each of the above described waveforms, the maximum amplitude of the first, second and (if present) further waveforms $c_j(r)$ that makeup the superpositioned waveform are the same. It has been found in experimentation that, by keeping the maximum amplitude of the waveforms $c_j(r)$ the same provides an enhanced noise reduction over a narrow frequency bandwidth. However, the disclosed leading edge serration waveform envisages superpositioned waveforms having different maximum amplitudes.

In a second experimental series, an aerofoil having a leading edge waveform with $h/c_0=0.167$, $\gamma_1=0.067$, $\gamma_1=0.133$ and an aerofoil cross sectional profile corresponding to an NACA-65 series aerofoil was tested in a windtunnel under representative conditions with airflows at 20 m/s. An image of the leading edge of the test aerofoil a is shown in FIG. 10. The results from these tests are shown in FIG. 11.

As can be seen, the noise at frequencies between 400 Hz and 800 Hz is reduced relative to prior arrangements. Similar experiments were conducted for the same aerofoil at higher airflow velocities. In those tests, the frequency at which maximum noise attenuation was achieved increased approximately linearly with airflow velocity. Consequently, the results from the tests with flat plates are verified.

It has been found from further experiments that an important parameter for achieving maximum noise attenuation at a particular frequency f is the downstream distance between nadirs of first and second troughs, $h_{tt}$ (see FIG. 10). In particular, a maximum noise attenuation frequency f can be calculated for a given distance $h_{tt}$ at a given streamwise velocity U using the following equation:

$$f = \frac{u}{2h_{tt}}$$

Thus in the example shown in FIG. 10, for a flow velocity of 20 meters per second, and an $h_{tt}$ of 2 cm gives a peak noise attenuation frequency of 500 Hz. This is consistent with the results found by experimentation (see figure z).

It will be understood that the invention is not limited to the embodiments above-described and various modifications and improvements can be made without departing from the concepts described herein. For example, the invention could be employed in aerofoils of different parts of a gas turbine engine, different parts of an aircraft, or in non-aviation applications, such as wind turbines, marine propellers, industrial cooling fans, and other aerofoils in which noise is a consideration. The invention has been found to be effective for a wide range of aerofoil cross sectional profiles, and also for flat plate aerofoils.

Except where mutually exclusive, any of the features may be employed separately or in combination with any other features and the disclosure extends to and includes all combinations and sub-combinations of one or more features described herein.

The invention claimed is:
1. An aerofoil component comprising:
a leading edge; and
a trailing edge, at least one of the leading edge and the trailing edge defining a waveform profile, the waveform profile extending in a spanwise direction of the aerofoil component, and the waveform profile including a superposition of a first wave and a second wave, the first wave and the second wave each having a different wavelength such that the waveform profile defines a plurality of first and second recesses spaced in the spanwise direction of the aerofoil component, the plurality of first and second recesses of the waveform profile extending in a chordwise direction of the aerofoil component, each of the plurality of first recesses having a different depth than a depth of each of the plurality of second recesses in the chordwise direction, the plurality of first recesses being located forward of a mean chord line of the waveform profile in the chordwise direction and the plurality of second recesses being located rearward of the mean chord line of the waveform profile in the chordwise direction.

2. The component according to claim 1, wherein is the plurality of first recesses are each separated in the spanwise direction by at least one second recess of the plurality of second recesses.

3. The component according to claim 1, wherein the first wave and the second wave have equal amplitudes.

4. The component according to claim 1, wherein the waveform profile is defined by $$c(r) = C_0 + h_1 \cos\left(\frac{2\pi r}{\gamma_1}\right) + h_2 \cos\left(\frac{2\pi r}{\gamma_2}\right)$$

where c(r) is representative of a chordwise extent c of the leading edge or the trailing edge from the mean chord line $C_0$ as a function of a span r, $h_1$ and $h_2$ are representative of the amplitude of the first wave and the second wave respectively, and $\gamma_1$ and $\gamma_2$ are representative of the wavelength of the first wave and the second wave.

5. The component according to claim 4, wherein $\gamma_1/\gamma_2$ is between ½ and 2.

6. The component according to claim 4, wherein $h/c_0$ is between 1/10 and 1/6.

7. The component according to claim 1, wherein an aerofoil cross sectional profile of an aerofoil varies across a span of the aerofoil in accordance with a formula:

$$y(x, r) = \begin{cases} f(x/c_0), & 0 < x/c_0 < 2/3, \\ f(x/c(r)), & 2/3 \le x/c(r) \le 1 \end{cases}$$

where y is representative of a thickness of the aerofoil at chordwise position x and spanwise position r, and f(x) defines the aerofoil cross sectional profile, and wherein x=0 is defined as the trailing edge, and x=1 is defined as the leading edge.

8. The component according to claim 1, wherein the aerofoil component is an aerofoil of a gas turbine engine.

9. The component according to claim 8, wherein the aerofoil is an outlet guide vane of the gas turbine engine.

10. A gas turbine engine comprising the component according to claim 1.

11. An aircraft comprising the gas turbine engine according to claim 10.

12. A method of designing an aerofoil component, the method comprising steps of:
defining a first wave and a second wave, the first wave having a different wavelength to the second wave;
superposing the first wave and the second wave to define a superposed waveform; and
defining an aerofoil having a leading edge profile or a trailing edge profile including the superposed waveform such that the leading edge profile or the trailing edge profile defines a plurality of first and second recesses spaced in the spanwise direction of the aerofoil component, the plurality of first and second recesses of the waveform profile extending in a chordwise direction of the aerofoil component, each of the plurality of first recesses having a different depth than a depth of each of the plurality of second recesses in the chordwise direction, the plurality of first recesses being located forward of a mean chord line of the waveform profile in the chordwise direction and the plurality of second recesses being located rearward of the mean chord line of the waveform profile in the chordwise direction.

* * * * *